(12) United States Patent
Fisk et al.

(10) Patent No.: US 10,583,846 B2
(45) Date of Patent: Mar. 10, 2020

(54) DRIVE STATION ARRANGEMENTS

(71) Applicant: RAIL-VEYOR TECHNOLOGIES GLOBAL INC., Lively (CA)

(72) Inventors: James Everrett Fisk, Antioch, IL (US); Patrick Walter Joseph Fantin, Hanmer (CA); William John McCall, Garson (CA); David Wilhelm Niemeyer, Val Caron (CA); Curtis Ron Reay, Hanmer (CA); Eric Benjamin Alexander Zanetti, Sudbury (CA); Esko Johannes Hellberg, Lively (CA)

(73) Assignee: Rail-Veyor Technologies Global Inc., Sudbury, Ontario (CA)

( * ) Notice: Subject to any disclaimer, the term of this patent is extended or adjusted under 35 U.S.C. 154(b) by 160 days.

(21) Appl. No.: 15/399,567

(22) Filed: Jan. 5, 2017

(65) Prior Publication Data

US 2018/0186385 A1  Jul. 5, 2018

Related U.S. Application Data

(63) Continuation of application No. PCT/CA2015/050251, filed on Mar. 31, 2015.

(Continued)

(51) Int. Cl.
| | |
|---|---|
| *B61B 13/12* | (2006.01) |
| *B61L 27/04* | (2006.01) |
| *B61L 25/02* | (2006.01) |
| *B61L 25/04* | (2006.01) |
| *B61D 9/14* | (2006.01) |

(Continued)

(52) U.S. Cl.
CPC ............ *B61B 13/127* (2013.01); *B61D 9/08* (2013.01); *B61D 9/14* (2013.01); *B61F 1/12* (2013.01); *B61G 3/00* (2013.01); *B61G 3/22* (2013.01); *B61L 25/021* (2013.01); *B61L 25/023* (2013.01); *B61L 25/025* (2013.01); *B61L 25/048* (2013.01); *B61L 27/04* (2013.01); *B65G 17/123* (2013.01); *G05D 13/62* (2013.01); *B61D 3/00* (2013.01); *B65G 2201/04* (2013.01);

(Continued)

(58) Field of Classification Search
CPC .......... B61B 13/12; B61B 13/127; B61H 9/00
See application file for complete search history.

(56) References Cited

U.S. PATENT DOCUMENTS

| | | | | |
|---|---|---|---|---|
| 2,044,134 A * | 6/1936 | Storer | ...................... | B61K 1/00 104/25 |
| 2,947,253 A * | 8/1960 | Cirilo | ...................... | E21B 23/14 166/55.2 |

(Continued)

*Primary Examiner* — Jason C Smith

(57) ABSTRACT

The present invention generally relates to a rail transport system having no internal drive, and in particular to an improved rail transport system for conveying bulk materials. The rail transport system includes horizontal and vertical drive stations that include a drive tire that rotates on a plane parallel to the track. In this arrangement, force is applied on a different plane than earlier systems, and the reaction force is separated out of the tensioning device. The improvements of the drive stations provide for a reduction of steel used in the system, improved manufacturability and, therefore, reduction in system component costs as compared to previous drive stations. Moreover, the drive stations allow for improved maintainability and access to the drive tires.

9 Claims, 10 Drawing Sheets

Related U.S. Application Data

(60) Provisional application No. 62/021,905, filed on Jul. 8, 2014.

(51) Int. Cl.
*B61D 9/08* (2006.01)
*B61G 3/22* (2006.01)
*B65G 17/12* (2006.01)
*B61F 1/12* (2006.01)
*B61G 3/00* (2006.01)
*G05D 13/62* (2006.01)
*B61D 3/00* (2006.01)

(52) U.S. Cl.
CPC ............... *B65G 2812/0299* (2013.01); *B65G 2814/0364* (2013.01)

(56) References Cited

U.S. PATENT DOCUMENTS

| | | | | |
|---|---|---|---|---|
| 3,039,402 | A | * | 6/1962 | Richardson ........... B61B 13/127 104/168 |
| 3,752,334 | A | * | 8/1973 | Robinson, Jr. ......... B65G 35/00 104/168 |
| 2018/0186385 | A1 | * | 7/2018 | Fisk ...................... B61L 25/021 |

* cited by examiner

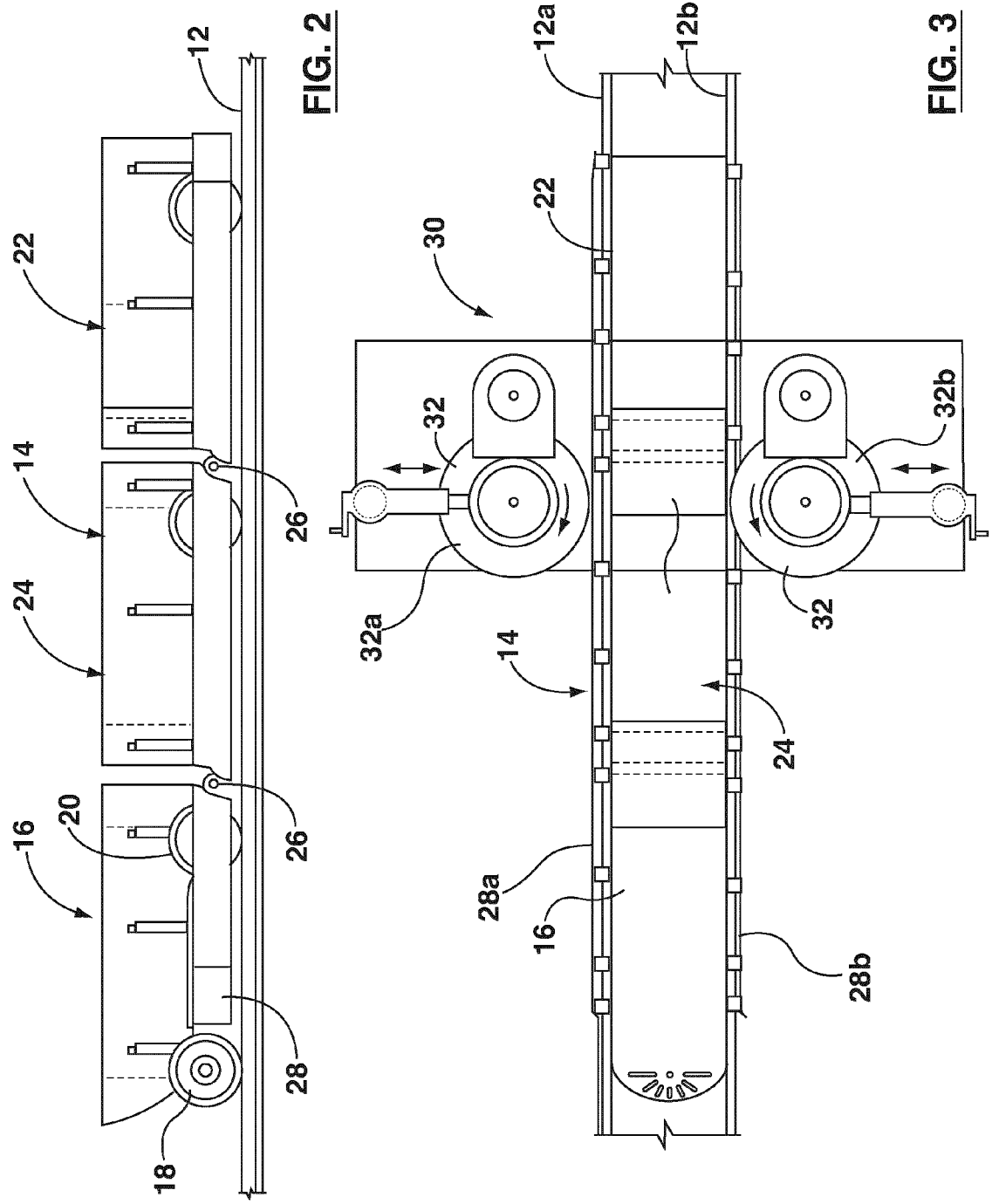

DRIVE STATION ARRANGEMENTS

CROSS REFERENCE TO RELATED APPLICATIONS

This application is a continuation of PCT application Serial Number PCT/CA2015/050251 filed Mar. 31, 2015, entitled DRIVE STATION ARRANGEMENTS, which claims the benefit of priority of U.S. provisional patent application Ser. No. 62/021,905, filed Jul. 8, 2014, the content of both of which are incorporated by reference in their entirety.

FIELD OF THE INVENTION

The present invention generally relates to a rail transport system having no internal drive, and in particular to drive station arrangements for moving cars through the rail transport system.

BACKGROUND

Methods and arrangements for moving bulk materials in conventional trains, trucks, conveyor belts, aerial tramways or as a slurry in a pipeline are well known and are typically used in various industries because of site-specific needs or experience. In the minerals and aggregate industries, for example, bulk materials are moved from mining or extraction sites to a process facility for upgrading or sizing. Trucks had been the system of choice for many years for moving bulk materials. Trucks were enlarged for off-road vehicles because of their efficient transport of bulk materials and increased capacity. These vehicles, however, are limited to site specific applications and are provided at a high capital cost. Major off-road trucks have evolved that require very wide roadways for passing each other, are not energy efficient per ton-mile of material transported, have limited hill climbing ability, and are dangerous because of potential of operator error as well as being environmentally unpleasant neighbors.

Trains have been used for many years for bulk material transport in hopper cars. Because of low friction, the use of free rolling iron or steel wheels on steel tracks they are very efficient users of energy but are limited in capacity relative to the drivers or locomotives required. Large tonnage long trains use multiple drivers that are heavy units, which dictate the weight of rail and ballast requirements. All railroads must be designed for the weight of the drivers or locomotives included fuel, not the combination of car plus loads, which are significantly less. The drivers need to be of sufficient weight so that the rotary drive tire makes contact with the stationary rail and must have sufficient friction to produce forward or reverse movement of what will include heavily loaded cars. The inclination capable of conventional railroad systems is limited to the friction between the weighted drive wheels and track. Rail cars are individual units that each has to be loaded in a batch process, one car at a time. Bulk materials can be unloaded from hopper cars by opening bottom dump hatches or can be individually rotated to dump out of the top. Spotting cars for both loading and unloading is time consuming and labor intensive.

Although moving from one location to another may be cost effective, the added cost of batch loading and unloading stages in shorter distance transports reduces the rail transport cost effectiveness. With normal single dual track train systems only one train can be used on a system at a time.

Conveyor belts have been used for many years to move bulk materials. A wide variety of conveyor belt systems exist that can move practically every conceivable bulk material. Very long distance single belt runs are very capital cost intensive and are subject to catastrophic failure when a belt tears or rips, typically shutting down the entire system and dumping the carried load, requiring cleanup. Conveyor belts are relatively energy efficient but can require high maintenance because of an inherent problem of multiple idler bearings requiring constant checking and replacement. Short distance conveyor belts are commonly used in dry or clamp transport of almost all types of materials. Because conveyor belts are very flexible and desirably operated over fairly flat terrain, they are not efficient at transporting moderately high solids slurry where water and fines can accumulate in low spots and spill over the side creating wet spilled slurry handling problems.

Some bulk materials can be transported in pipelines when mixed with water to form slurry that is pushed or pulled with a motor driven pump impeller in an airless or flooded environment. The size of the individual particles that are present in the bulk materials dictates the transport speed necessary to maintain movement. For example, if large particles are present then the velocity must be high enough to maintain movement by saltation or skidding along the bottom of the pipe of the very largest particles. Because pipelines operate in a dynamic environment, friction is created with the stationary pipe wall by a moving fluid and solid mass. The higher the speed of the moving mass the higher the friction loss at the wall surface requiring increased energy to compensate. Depending on the application, the bulk material has to be diluted with water initially to facilitate transport and dewatering at the discharge end.

Light rail, narrow gage railroads for transporting bulk material from mines and the like is known as described by way of example with reference to U.S. Pat. No. 3,332,535 to Hubert et al. wherein a light rail train made up of several cars is propelled by drive wheels and electric motors combinations, dumping over an outside loop. By way of further example, U.S. Pat. No. 3,752,334 to Robinson, Jr. et al. discloses a similar narrow gage railroad wherein the cars are driven by an electric motor and drive wheels. U.S. Pat. No. 3,039,402 to Richardson describes a method of moving railroad cars using a stationary friction drive tire.

While the above described transport systems and methods have specific advantages over conventional systems, each is highly dependent upon a specific application. It has become apparent that increases in labor, energy and material costs plus environmental concerns that alternate transport methods need to be applied that are energy and labor efficient, quiet, non-polluting, and esthetically unobtrusive. US Patent Publications US 2003/0226470 to Dibble et al. for "Rail Transport System for Bulk Materials", US 2006/0162608 to Dibble for "Light Rail Transport System for Bulk Materials", and U.S. Pat. No. 8,140,202 to Dibble describe a light rail train utilizing an open semi-circular trough train with drive stations, the disclosures of which are herein incorporated by reference in their entirety. Such a light rail system offers an innovative alternative to the above mentioned material transport systems and provides for the transport of bulk materials using a plurality of connected cars open at each end except for the first and last cars, which have end plates. The train forms a long open trough and has a flexible flap attached to each car and overlapping the car in front to prevent spillage during movement. The lead car has four wheels and tapered side drive plates in the front of the car to facilitate entry into the drive stations. The cars that follow have two wheels with a clevis hitch connecting the front to the rear of the car immediately forward. Movement of the train is provided by a series of appropriately placed drive stations having drive motors on either side of the track which are AC electric motors with drive means such as tires to provide frictional contact with the side drive plates. At each drive station, each drive motor is connected to an AC inverter and controller for drive control, with both voltage and frequency being modified as needed. The electric motors each turn a tire in a horizontal plane that physically contacts two parallel side drive plates external of the wheels of each car. Pressure on the side drive plates by these drive tires converts the rotary motion of the tires into horizontal thrust. The wheels on the cars are spaced to allow operation in an inverted position by use of a double set of rails to allow the cars to hang upside down for unloading. By rotating this double track system the unit train can be returned to its normal operating condition. Such a system is well known and commercially referred to as the Rail-Veyor™ material handling system.

Flanged wheels may be symmetrical to the side drive plates allowing operation in an inverted position which, when four rails are used to encapsulate the wheel outside loop discharge of the bulk material is possible. By using elevated rails, the train can operate in the inverted position as easily as in the convention manner.

Yet further, drives for such light rail systems have been developed as described in U.S. Pat. No. 5,067,413 to Kiuchi et al. describing a device for conveying travelable bodies which are provided no driving source, on a fixed path. A plurality of travelable bodies travels on the fixed path while aligned substantially in close contact with each other. Traveling power is transmitted to one of a plurality of travelable bodies which is positioned on at least one end of the alignment. The traveling power drives the travelable body with frictional force while pressing one side surface of the travelable body, and is transmitted to the travelable body while backing up the other side surface of the travelable body. A device to transmit traveling power is arranged on only a part of the fixed path. While light rail systems such as the Rail-Veyor™ material handling system above described are generally accepted, there is a need to provide an improved system having high efficiency and reliability with regard to controlling the movement of the train and in particular multiple trains with the bulk material transport system. The present invention is also directed to an improved system and method for controlling such light rail systems in an efficient and reliable manner.

SUMMARY

The present invention generally relates to a rail transport system having no internal drive, and in particular to an improved rail transport system for conveying bulk materials. The rail transport system includes improvements in functionality, manufacturability and, therefore, reduction in system component costs. The rail transport system further includes drive system arrangements that include improvements in reliability and functionality.

According to an aspect of the present invention, there is provided a drive assembly for a rail transport system for conveying bulk materials via a plurality of cars adapted to form a train, each car having a pair of side drive plates and a trough arrangement for carrying the bulk materials on a rail. The drive assembly comprising: a support structure, at least one drive unit connected to the support structure. The drive unit including a drive tire adapted to frictionally contact a side drive plate of at least one of the cars for imparting a driven moment to the car. The drive assembly further comprising a spring element operatively located between the support and the drive unit to control squeeze force between the contacting drive tire and side plate of the car. The drive unit is further adapted to pivot at the connection to the support structure on a plane parallel to the track such that drive force is reacted at the connection between the drive unit and the support and squeeze force is reacted through the spring element.

In one embodiment, the drive unit is pivotably connected to the support structure such that the drive tires are accessible for maintenance therefor.

In another embodiment, the drive force is reacted at a pivot bushing connecting the drive unit to the support structure.

In a further embodiment, the spring element is an air spring arrangement to control the squeeze force between the drive tire and the side drive plates.

In a still further embodiment, the drive assembly further comprises a frame for supporting the support structure relative to the rail.

According to another aspect of the present invention, there is provided a drive assembly for a rail transport system for conveying bulk materials via a plurality of cars adapted to form a train, each car having a pair of side drive plates and a trough arrangement for carrying the bulk materials on a rail. The drive assembly comprising: a support structure, and at least one drive tire for frictionally contacting the side drive plates of at least some of the cars for imparting a driven moment to each car. The drive tire being pivotally connected to the support structure such that the drive tires are accessible for maintenance therefor.

In one embodiment, the drive force is reacted at the pivot connection.

In another embodiment, the drive force is reacted at a pivot bushing connecting the drive tire to the support structure.

In a further embodiment, the drive unit further comprises a frame for supporting the support structure relative to the rail.

According to further aspect of the present invention, there is provided a drive assembly for a rail transport system for conveying bulk materials via a plurality of cars adapted to form a train, each car having a pair of side drive plates and a trough arrangement for carrying the bulk materials on a rail. The drive assembly comprising: at least one drive unit comprising a motor and a drive tire. The motor being adapted to rotate the drive tire to frictionally contact a side drive plate of at least one of the cars for imparting a driven moment to the car. The drive assembly further comprising a mounting plate situated between the motor and the drive tire, and a support structure adapted to carry the mounting plate such that drive force from the drive unit and squeeze force between the drive tire and side plate are reacted through the mounting plate to the support structure.

In one embodiment, the mounting plate further comprises an engagement for allowing hoisting of the drive unit from the support structure.

In another embodiment, the drive unit further comprises an engagement for allowing hoisting of the drive unit from the support structure.

In a further embodiment, the mounting plate comprises a mounting engagement for selectively adjusting the proximity of the drive tire to the side plate for selective control of squeeze pressure between the drive tire and the side plate.

In a still further embodiment, the mounting plate defines a plurality of apertures. The control of squeeze pressure is being capable of selective adjustment by affixing the mounting plate to the support system via a pin arrangement relative to one of the apertures of the mounting plate.

In a yet further embodiment, the drive assembly further comprises a base for supporting the support structure relative to the rail.

In any of the embodiments described above the drive assembly can further comprises a dynamic braking arrangement for limiting rotation of the drive tire. The braking effort of the dynamic braking arrangement being controlled by limiting current to the drive unit assembly.

In a further embodiment of any of the embodiments described above, the drive assembly can further comprises a mechanical braking arrangement for limiting rotation of the drive tire. The mechanical braking arrangement being a hydraulic release type arrangement.

BRIEF DESCRIPTION OF THE DRAWINGS

Various embodiments of the invention are described by way of example with reference to the accompanying drawings and appendices. The present invention will be apparent to those skilled in the art by reading the following detailed description of various embodiments thereof, with reference to the attached drawings, in which:

FIGS. 2 and 3 are side and top plan views, respectively, of one embodiment of a train operable with the system of FIG. 1;

DETAILED DESCRIPTION

The present invention will now be described more fully hereinafter with reference to the accompanying drawings and appendices, in which embodiments of the invention are shown. This invention may, however, be embodied in many different forms and should not be construed as limited to the embodiments set forth herein. Rather, the embodiments herein presented are provided so that this disclosure will be thorough and complete, and will fully convey the scope of the invention to those skilled in the art.

Figure 1:
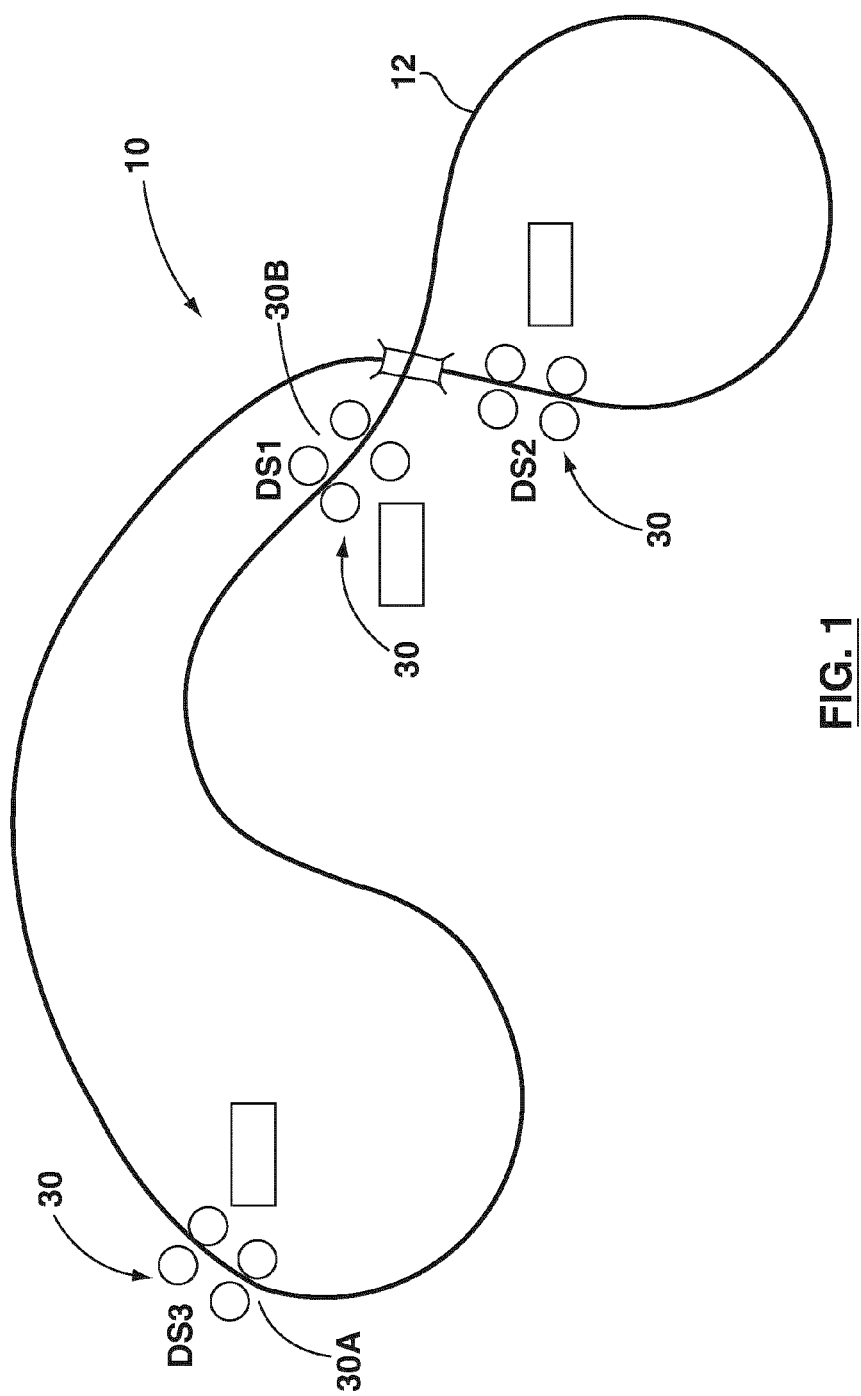
FIG. 1 is a diagrammatical illustration of one rail system in keeping with the teachings of the present invention.

With reference initially to FIGS. 1-3, one train system 10, in keeping with the teachings of the present invention, comprises a track 12 having parallel rails 12a, 12b. A train 14 includes a first or lead car 16 having both forward and rear wheel pairs 18, 20 operable on the track 12 for providing a free wheeling movement to the lead car. For the embodiment herein described by way of example, the train includes additional cars described as a second or rear car 22 and an intermediate car 24 or multiple intermediate cars carried between the lead and rear cars. The rear and intermediate cars 22, 24 include a forward pivotal connection 26 for pivotally connecting the intermediate and rear cars to adjacent forward cars. The rear and intermediate cars 22, 24 have only rear wheel pairs 20 operable on the track 12 for providing a free wheeling movement thereto.

Figure 4:
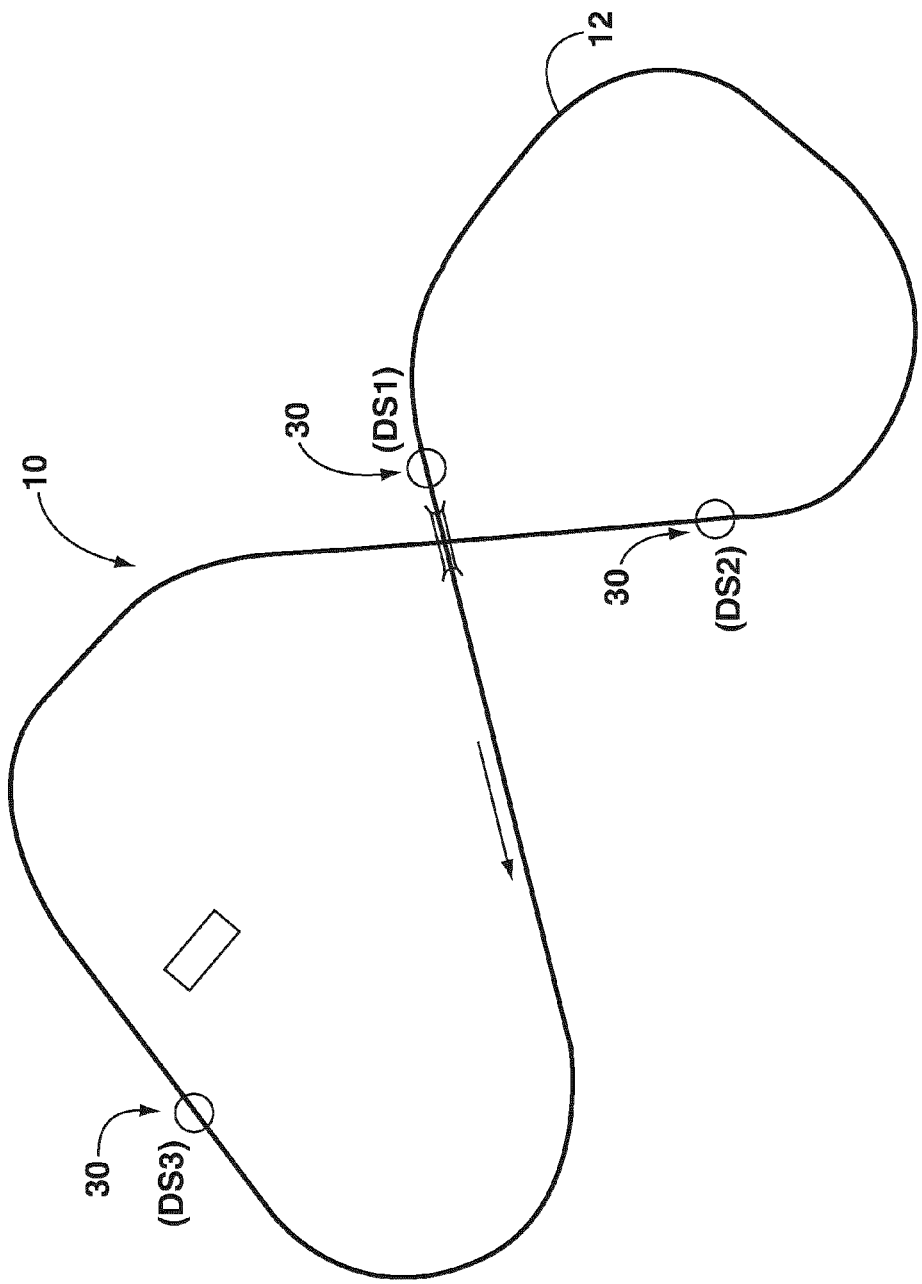
FIG. 4 is a diagrammatical illustration of a track arrangement operable with a control system of the present invention.
Figure 5A:
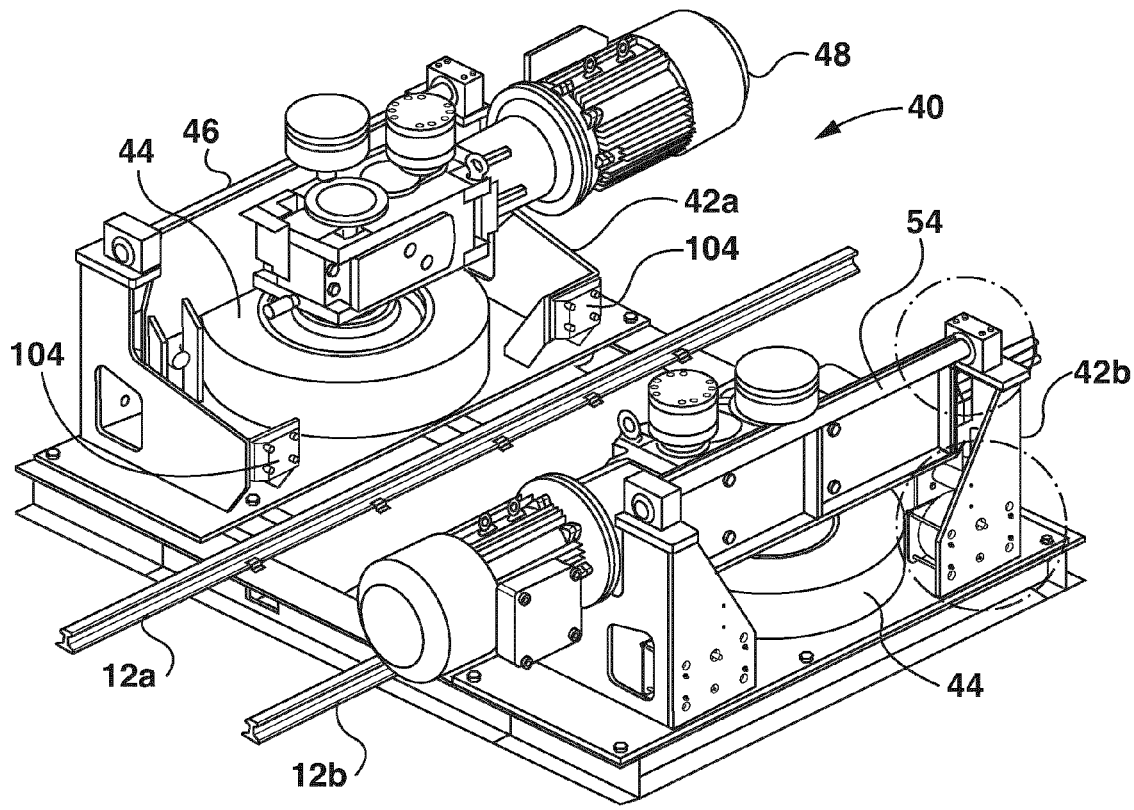
FIGS. 5a-5c are diagrammatical illustrations of (a) a horizontal drive station (FIG. 5a), (b) an isolated view of the spring element (FIG. 5b), and (c) an isolated view of the pivot bearing (FIG. 5c), all according to embodiments of the present invention.
Figures 5B, 5C:
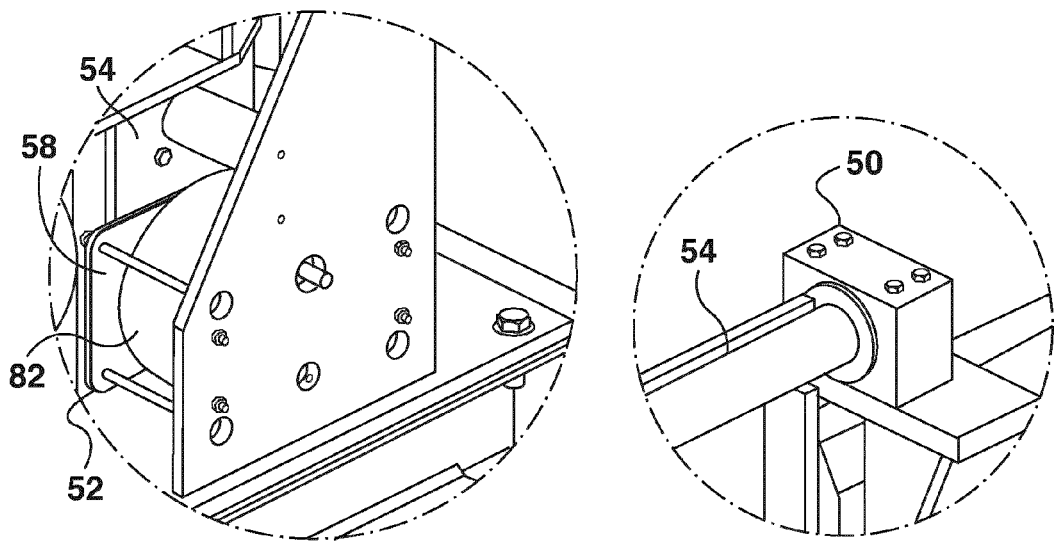

With continued reference to FIG. 2, each of the cars has a side plate 28 affixed thereto. With reference to FIGS. 1, 3-4, multiple drive stations 30 each have a variable frequency drive (VFD) including a drive tire 32 for frictionally contacting the side plate 28 and imparting a driven movement to each car and thus the train 14. As illustrated with continued reference to FIG. 3, the embodiment herein described includes each car having opposing side plates 28a, 28b and opposing drive tires 32a, 32b. Specifically, each car may have a fixed side plate on each side, which runs the length of the car and spaced outside the wheels and tracks. These side plates may be located symmetrically with the wheels and parallel to the light rails. In another arrangement, the side plates may be located asymmetrical with the wheels. However, in this arrangement, the wheels are part of the side plates such that the sideplate-wheel arrangement allows the train to be moved either downstream or upstream. Preferably, the wheels are placed to allow the train to operate in either an upright or an inverted position. Each drive stations 30 includes A/C inverters and a controller connected to every set of drive motors such that the motors may be synchronized through modifying of at least one of voltage and frequency thereto. Forward or reverse motion of the train is the result of horizontal rotation of tires on opposite sides of the train turning in opposite directions with suitable pressure of said rotation that provides minimal slip between the tire surface and side plates. In other words, the two opposing tires are both pushed inward toward the center of the track. In order the stop the train, the drive tires 32 are further adapted to engage and apply pressure to the side plate 28 of the car.

Referring to FIGS. 5-12, horizontal drive station and vertical drive station arrangements are shown, respectively, according to embodiments of the present invention. Referring first to the horizontal drive station 40 design of FIGS. 5a-5c, this arrangement may be utilized for installations having restricted height clearances. The improvements of the horizontal drive station provide for a reduction of steel used in the system, improved manufacturability and, therefore, reduction in system component costs as compared to previous drive stations. Moreover, the arrangement of the drive station separates the drive force and the squeeze force. In particular, the drive force is reacted at the pivot bearings 50 and the squeeze force is isolated to the rotating element, i.e. the drive tire 44. The support structure 42 of the horizontal drive station 40 also provides for improved maintainability and access to the drive tires 44.

The support structure 42 provides a base for mounting the drive unit assembly 46. In most applications, the support structure 42 will be mounted to a frame 96 that transverses the parallel tracks 12*a*, 12*b*. In this arrangement, two support structures 42*a*, 42*b* are provided on either side of the parallel tracks 12*a*, 12*b* in order to allow two separate drive unit assemblies to engage opposite side plates of the car.

Figure 6:
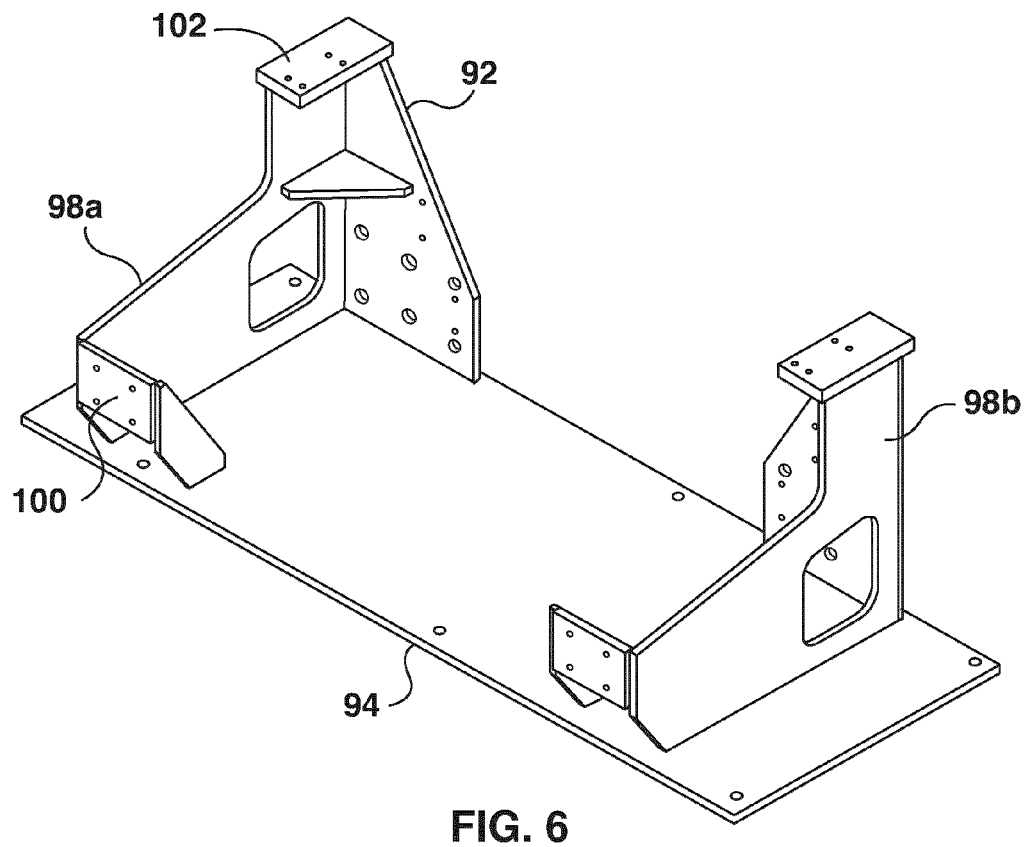
FIG. 6 is a perspective view of the support structure of the horizontal drive station according to an embodiment of the present invention.

In order to the accommodate the drive unit assembly 46, the support structure 42 is typically made up of a base plate 94 to which two side plates 98*a*, 98*b* are attached perpendicular thereto (FIG. 6). Each side plate 98 being connected at one end to a mounting plate 92, which runs perpendicular to the side plate 98 and substantially parallel to the track 12. In some applications, a bumper mount plate 100 is positioned parallel to the mounting plate 92 at the other end of the side plate 98. If present, a bumper 104 can be attached to the bumper mount plate 100 to minimize damage to the overall drive station 30, in the event a car is laterally thrust against the drive station while passing through. In order to accommodate the pivot bearing 50 of the drive unit assembly 46, a pivot mount plate 102 is provided to cover the corner formed between the side plate 98 and the mounting plate 92.

The drive unit assembly 46 includes at least one drive tire 44 which is coupled to a motor-gearbox arrangement 48 (e.g., an electro-mechanical drive having the appropriate horsepower rating to propel the train and an appropriate gear ratio to move it at a designated speed, and to meet the desired duty cycle) and is pivotably connected to the support structure 42 such that the unit 46 may pivot for maintenance (e.g., removal of tires or servicing of the drive). Each drive unit 46 operates a drive tire 44 for frictionally contacting the side plate 28 of a car. An arrangement is provided to control the required opposing pressures to provide adequate forward or reverse thrust to move the train 14 without slipping.

Furthermore, the plane at which the drive tire 44 pivots is changed in the horizontal drive station described herein as compared to prior drive stations. Changing this plane alters the way the reaction forces from the drive station thrust are carried to the support structure 42.

Specifically, earlier systems included a threaded rod which was used to pull the drive tire in by pivoting the entire drive into the train. In this arrangement, the normal (squeeze) force and the reactive thrust force are both carried as tension in the threaded rod.

Instead of the drive tire moving vertically with reference to the ground in prior drive stations, the drive tire 44 described herein rotates on a plane parallel to the track 12. In this arrangement, force is applied on a different plane than earlier systems, and the reaction force is separated out of the tensioning device. Specifically, the drive force and squeeze forces are separated, wherein the drive force is reacted at the pivot bearings 50 and the squeeze force is isolated to the rotating element, i.e. the drive tire 44. In this way, the normal (squeeze) force can be reacted through a spring element 52 which is designed to maintain the required force over a wider range of travel. Typically, the pivot bearings 50 are attached to the pivot mount plate 102 of the support structure 42.

Figure 7:
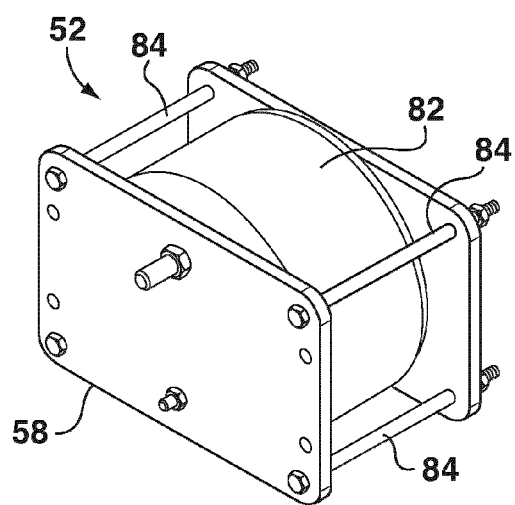
FIG. 7 is a perspective view of the spring element according to an embodiment of the present invention.

In one embodiment, the spring element 52 is provided as an air spring arrangement, which may be used to control such pressure (i.e., squeeze force) required between the tire 44 and side plate 28 of the train 14 (e.g., to adjust the tire/car engagement to account for tire wear and fabrication tolerances) (FIG. 7). As shown in the embodiment of FIG. 7, the spring element 52 can include a housing 58 for the air spring 82. The internal volume of the housing 58 can be adjusted by lengthening or shortening posts 84 in order to expand or compress the air spring 82. The spring element 52 is attached to support structure 42 in a location that allows pressure to be applied to the drive mounting plate 54, which ultimately results in the drive tire 44 being squeezed against the side plate 28. In one embodiment, the spring element 52 rests on the base plate 94 of the support structure 42 and is attached to the mounting plate 92 of the support structure 42. Generally, two spring elements 52*a*, 52*b* are used in each support structure 42, one mounted on each mounting plate 92. This arrangement allows for substantially even lateral force to be applied to the drive mounting plate 54 in the vicinity of the drive tire 44.

Figure 8A:
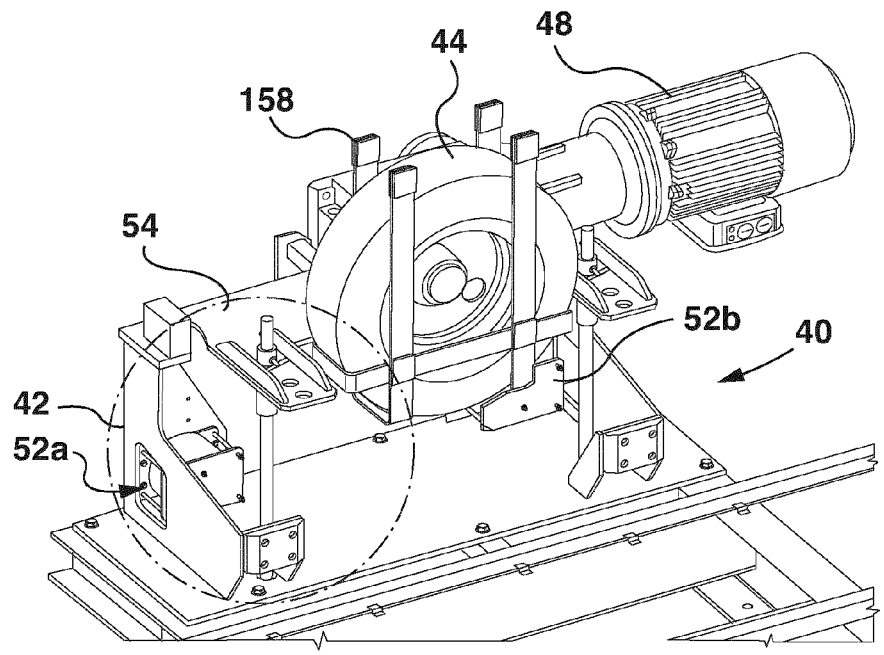
FIGS. 8a-8b are diagrammatical illustrations of (a) the drive assembly in an inactive position (FIG. 8a), and (b) an isolated view of the support posts (FIG. 8b), all according to embodiments of the present invention.
Figure 8B:
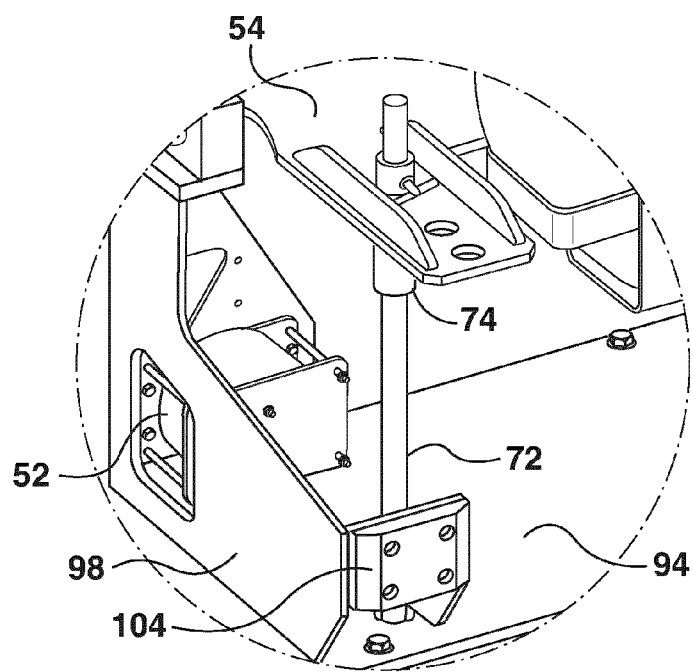

As mentioned above, to allow for maintenance of the drive tire(s) 44, the drive unit 46 can be pivoted from an active position where the drive tire 44 is positioned in a plane parallel to the track 12 to a inactive position where the drive tire 44 is positioned in a plane that is perpendicular to the track 12. The drive unit assembly 46, including the drive unit mounting plate 54, is pivoted through pivot bearings 50 positioned on the support structure 42. To improve worker safety during maintenance of the drive assembly 46, a tire harness 158 can be used to secure the drive tire 44 during pivoting of the assembly 46 and maintenance thereof (FIGS. 8*a*-8*b*).

When in the inactive position, the drive unit assembly 46 can be stabilized (i.e. prevented from pivoting back into the active position) by inserting and securing support rods 72 to the mounting plate 54. In one embodiment, the support rods 72 are inserted through hollow support pegs 74 connected to the mounting plate 54. The support pegs 74 are provided to allow for the mounting plate 54 and associated drive unit assembly 46 to be positioned away from the support structure 42 when in the active position.

Figure 9:
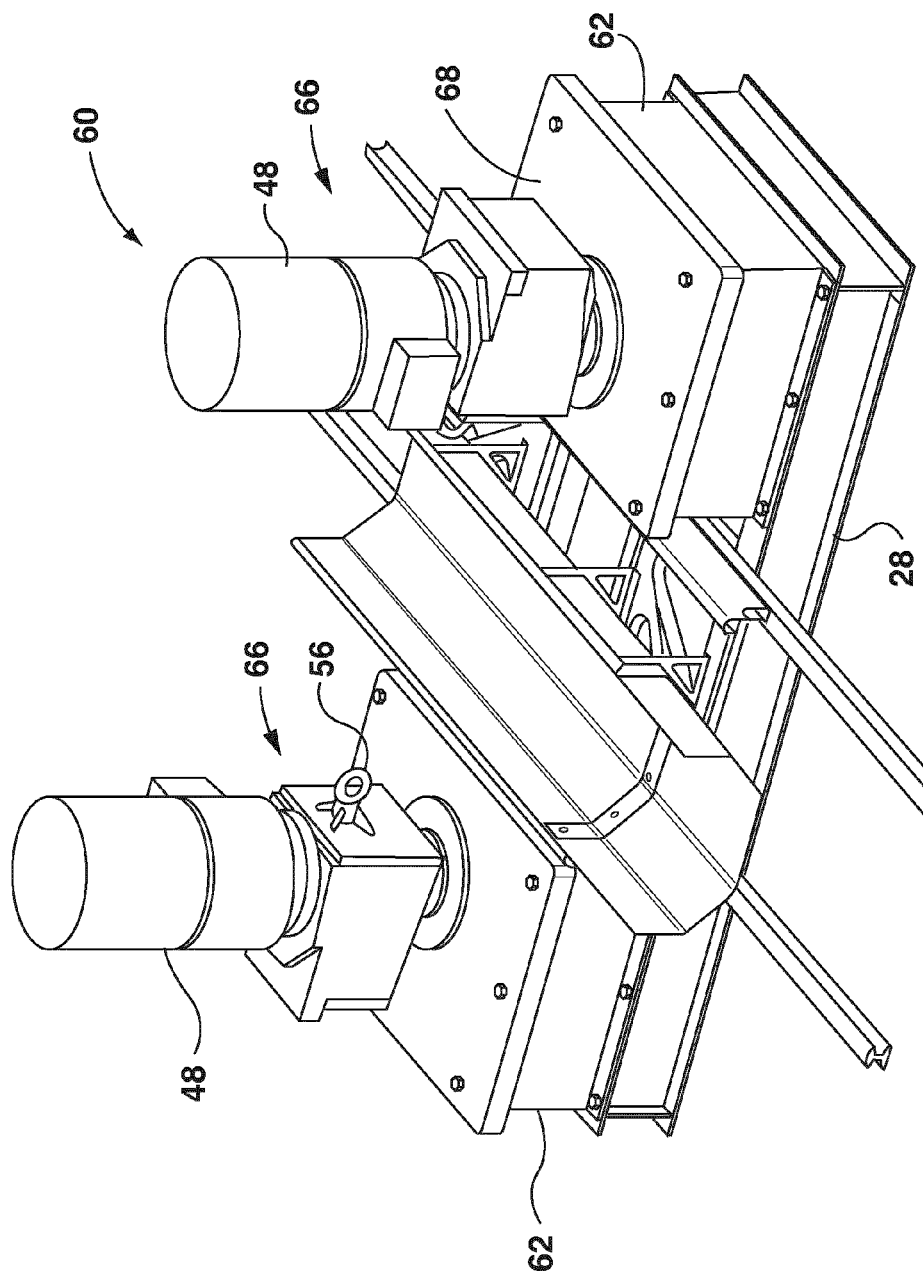
FIG. 9 is a perspective view of a vertical drive station according to an embodiment of the present invention.

Referring now to the vertical drive station 60 design shown in FIG. 9, this arrangement may be utilized for installations having no height clearance restrictions. The improvements of the vertical drive station 60 provide for a reduction of steel used in the system, improved manufacturability and, therefore, reduction in system component costs. The support structure 62 of the vertical drive station 60 is preferably a steel structure rather than a cement foundation. The support structure 62 as shown is also more robust, while using less steel as compared to traditional systems. Specifically, the support structure 62 is shown to be formed using a laser cut/bent steel plate design (see FIG. 10) instead of a structural member based design as used in traditional systems. The vertical drive station 60 also provides for improved maintainability and access to the drive tires 64. Specifically, the drive unit assembly 66 including a drive tires 64 are coupled to a motor-gearbox arrangement, as described above, via a drive mounting plate 68. In yet another arrangement, the drive unit 46 may be a hydrodynamic device as shown having a fluid coupling arrangement 142 (FIG. 11). Either one of the drive unit 66 or the drive mounting plate 68 includes engagement points, such as eyelets 56, for hoisting the unit for maintenance (e.g., replacement of tires or servicing of the drive). Each drive unit 66 operates a drive tire 64 for frictionally contacting the side plate 28 of a car. An arrangement is provided to control the required opposing pressures to provide adequate forward or reverse thrust to move the train 14 without slipping. Specifically, a plurality of apertures 70 are preformed in the drive unit mounting plate 68 (FIG. 12*b*) for selective adjustment to control such pressure required between the tire 64 and side plates 28 of the car by mounting the drive tire 64 in selective proximity to the side plates 28 of the car (e.g., to adjust the tire/car engagement to account for tire wear).

Figure 10:
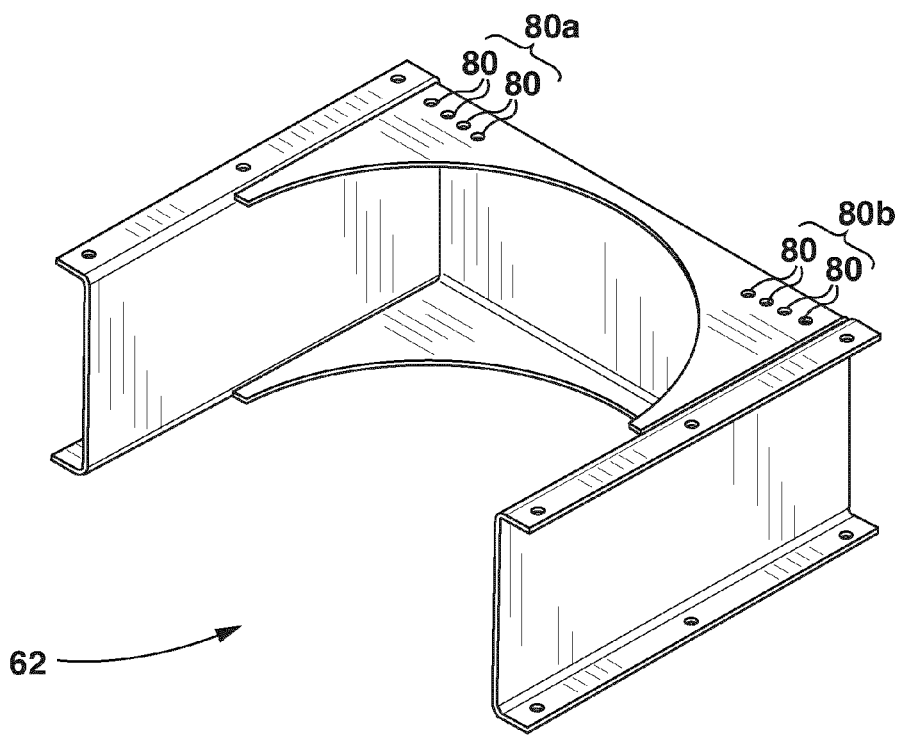
FIG. 10 is a perspective view of a support structure for use in a vertical drive station according to an embodiment of the present invention.
Figure 11:
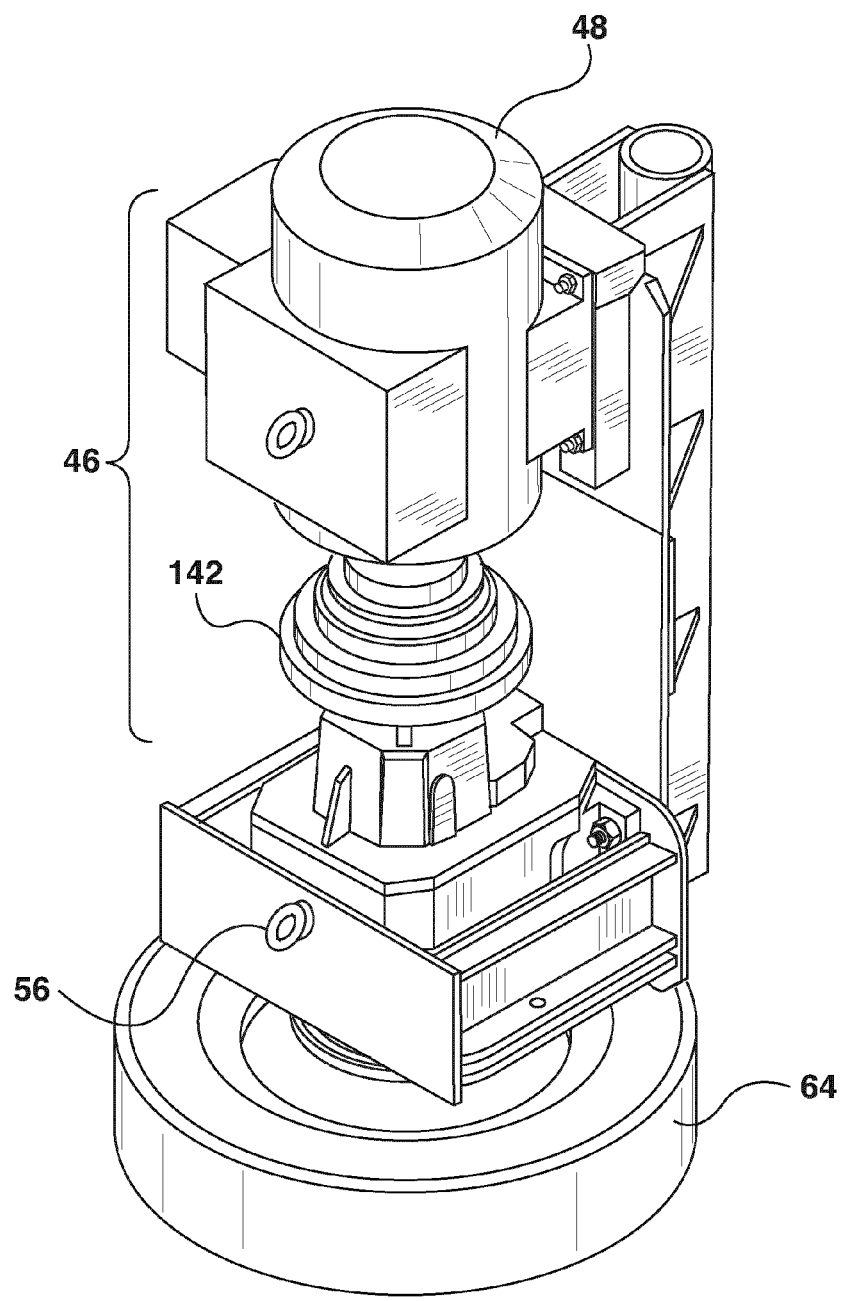
FIG. 11 is a perspective view of a drive unit assembly for use in a vertical drive station according to an embodiment of the present invention.
Figure 12A:
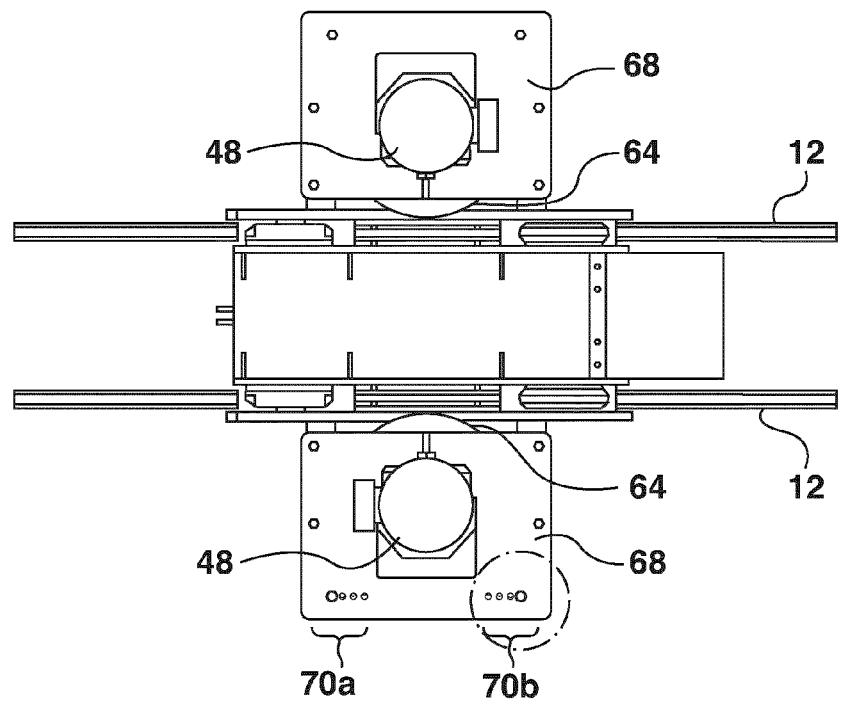
FIGS. 12a-12b are (a) a top plan view of the vertical drive station (FIG. 12a), and (b) an isolated view of the apertures of the mounting plate (FIG. 12b), both according to embodiments of the present invention.
Figure 12B:
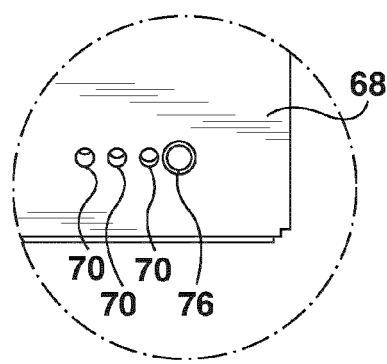

Selective adjustment to control pressure between the tire 64 and side plates 28 of the car is achieved by providing a plurality of apertures 70 preformed on the drive unit mounting plate 68 (FIG. 12b) and a corresponding number of apertures 80 on the support structure 62 (FIG. 10). The plurality of apertures 70 preformed on the drive unit mounting plate 68 are typically parallel to the edge of the mounting plate 68 distal to the track 12, whereas a corresponding number of apertures 80 are preformed on the support structure 62 and are offset from the edge of the support structure 62 distal to the track 12. Generally two sets of apertures 70a, 70b and 80a, 80b are preformed on the drive unit mounting plate 68 and support structure 62, respectively, at opposite ends of the plate 68 and support structure 62 along the edges distal to the track 12. The tire 64 can be incrementally positioned closer to the track 12, and by extension the side plate 28 of the car, by connecting the mounting plate 68 to the support structure 62 though one of the apertures 70 in the mounting plate 68 and the corresponding aperture 80 in the support structure 62 at a position that urges the mounting plate 68 closer to the track 12. In one embodiment, the mounting plate 68 is connected to the support structure 62 by inserting a pin 76 through the corresponding apertures 70, 80 in the mounting plate 68 and support structure 62.

The various components of the drive units 46, 66 may be optimized to provide the proper friction required between the drive tire 44, 64 and side plate 28 of the car. The frictional forces of these drive tires—side drive plate contact is optimized to avoid slippage between the drive tires 44, 64 and side plates 28, hence providing forward thrust. In one example, the surface of the side plate(s) 28 of the car may be adapted to improve such engagement with the drive tire 44, 64 (e.g., side plate material may be modified or a coating may be applied to the side plate). In another example, various specifications of the drive tire 44, 64 (e.g., tire pressure, composition, durometer, spring rate, etc.) may be made to modify the frictional forces between the drive tires 44, 64 and the side plate 28 of the car. Flexible drive tires 44, 64 may be made out of a variety of materials. Examples of suitable material, but not limited to, are soft solid tires, synthetic rubber tires, urethane pneumatic rubber tires and synthetic foam filled tires. The preferred tire 44, 64 is a foam filled pneumatic tire. Foam provides the flex function associated with air filled tires without the potential problem of rapid deflation. The flexing capability compensates for irregularities in side plate 28 spacing and also allowed for full contact of straight side plates 28 even in deformed sections that would lead to contact skips with nonflexible tires. The use of a deflatable tire could cause a loss of traction and offer potential for derailment. As provided in earlier systems, it was desired to have a low durometer for the drive tire 44, 64. In this way, the face of the foam filled tire would sufficiently spread (or sufficiently deform) upon contact with the side plate of the train to provide sufficient squeeze force to move the train.

The horizontal drive station 40 and vertical drive stations 60 as shown in FIGS. 5a-c and 9, respectively, include a braking device coupled to the motor-gearbox arrangement 48. The braking device may be in the form of a dynamic braking arrangement to prevent train 14 runaway on downhill runs and with positive locking brakes that are actuated in power off situations that can hold a train in place until the system can be returned to an operational status. Generally, braking may be achieved by two systems. In one embodiment, a service braking arrangement is provided through the motor control system, which dynamically brakes the drives 48 using the motors. In this arrangement, the braking effort is controlled by limiting or eliminating current to the drive unit assembly. In another embodiment, a mechanical braking system is provided in the form of a hydraulic release arrangement, which is installed as an extension of an intermediate shaft of the gearbox. This mechanical braking system may be utilized for holding and emergency situations. Moreover, both forms of braking systems can be included in the drive stations 40, 60 to provide redundancy in the system in the event of failure of one of the systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A drive assembly for a rail transport system for conveying bulk materials via a plurality of cars adapted to form a train, each car having a pair of side drive plates and a trough arrangement for carrying the bulk materials on a rail, said drive assembly comprising:
    at least one drive unit comprising a motor and a drive tire, wherein the motor is adapted to rotate the drive tire to frictionally contact a side drive plate of at least one of the cars for imparting a driven moment to the car,
    a mounting plate situated between the motor and the drive tire, and
    a support structure adapted to carry the mounting plate such that drive force from the drive unit and squeeze force between the drive tire and side plate are reacted through the mounting plate to the support structure,
    wherein the mounting plate and support structure define a plurality of patterned apertures that when aligned and connected via a pin arrangement inserted through corresponding apertures in the mounting plate and the support structure can be used to selectively control the squeeze force between the drive tire and side plate.

2. The drive assembly of claim 1, wherein the mounting plate further comprises an engagement for allowing hoisting of the drive unit from the support structure.

3. The drive assembly of claim 1, wherein the drive unit further comprises an engagement for allowing hoisting of the drive unit from the support structure.

4. The drive assembly of claim 1, wherein the mounting plate comprises a mounting engagement for selectively adjusting the proximity of the drive tire to the side plate for selective control of squeeze pressure between the drive tire and the side plate.

5. The drive assembly of claim 1, further comprising a base for supporting the support structure relative to the rail.

6. The drive assembly of claim 1, further comprising a dynamic braking arrangement for limiting rotation of the drive tire.

7. The drive assembly of claim 1, further comprising a mechanical braking arrangement for limiting rotation of the drive tire.

8. The drive assembly of claim 6, wherein braking effort of the dynamic braking arrangement is controlled by limiting current to the drive unit assembly.

9. The drive assembly of claim 7, wherein the mechanical braking arrangement is a hydraulic release type arrangement.

* * * * *